July 31, 1962  T. C. McGOW  3,047,127
WEIGHT SENSITIVE CONVEYOR
Filed Jan. 19, 1959  6 Sheets-Sheet 1

INVENTOR.
THOMAS C. McGOW
BY Price and Heneveld
ATTORNEYS

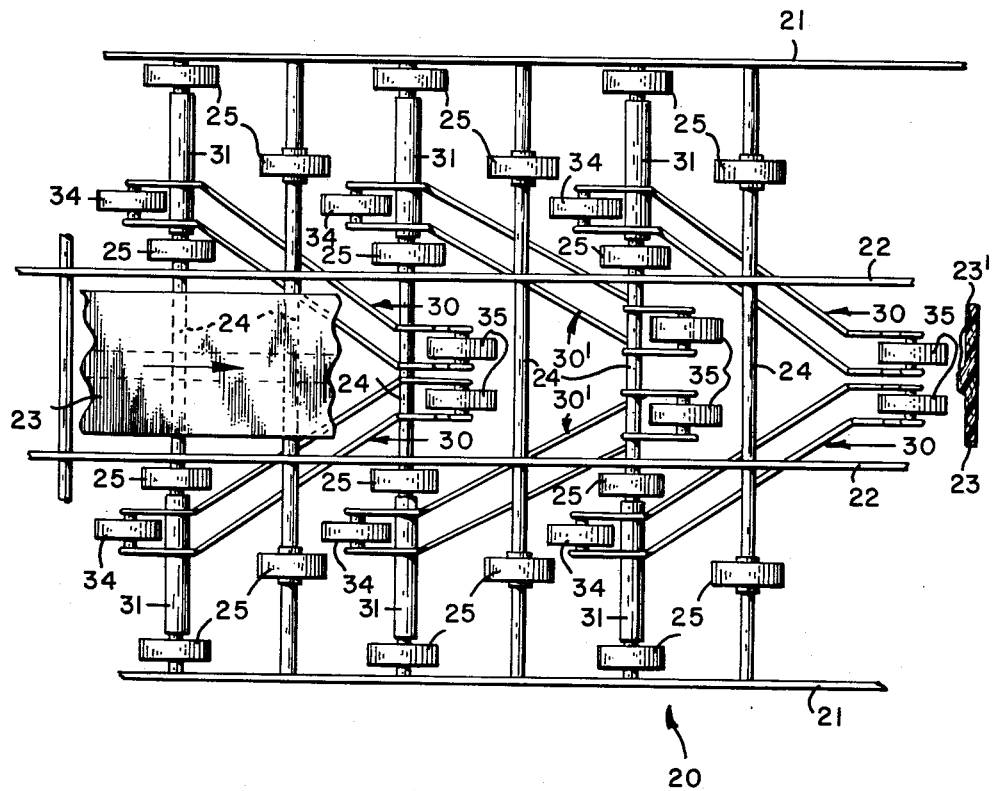
Fig.-7.
Fig.-8.
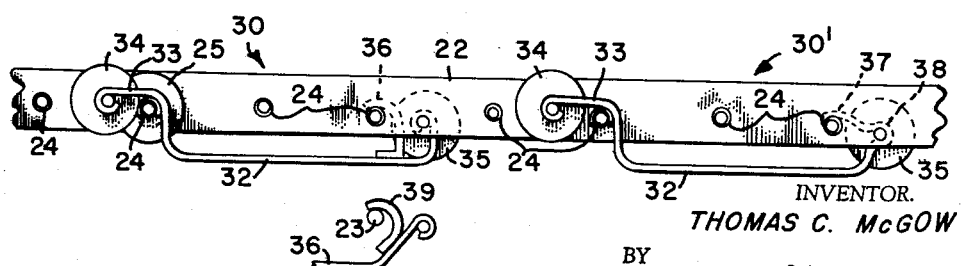
Fig.-8a.
INVENTOR.
THOMAS C. McGOW
BY
Price and Heneveld
ATTORNEYS

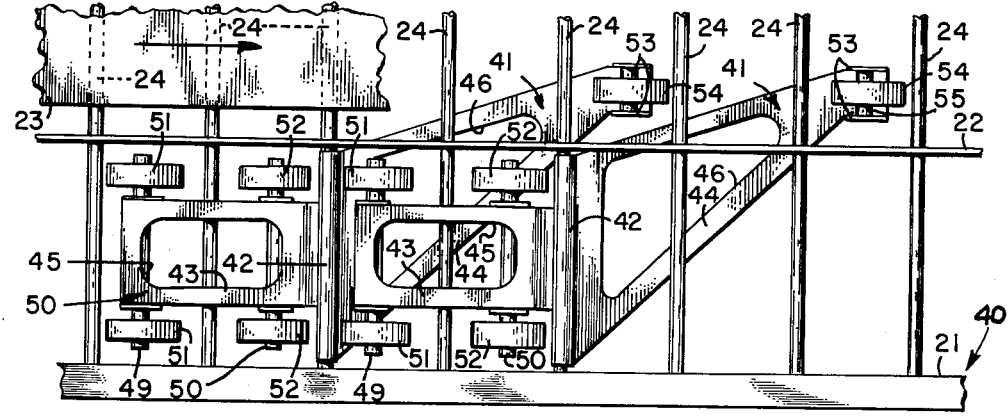
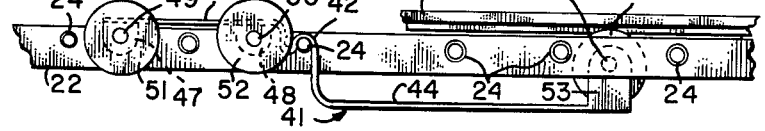
Fig.-9
Fig.-10.
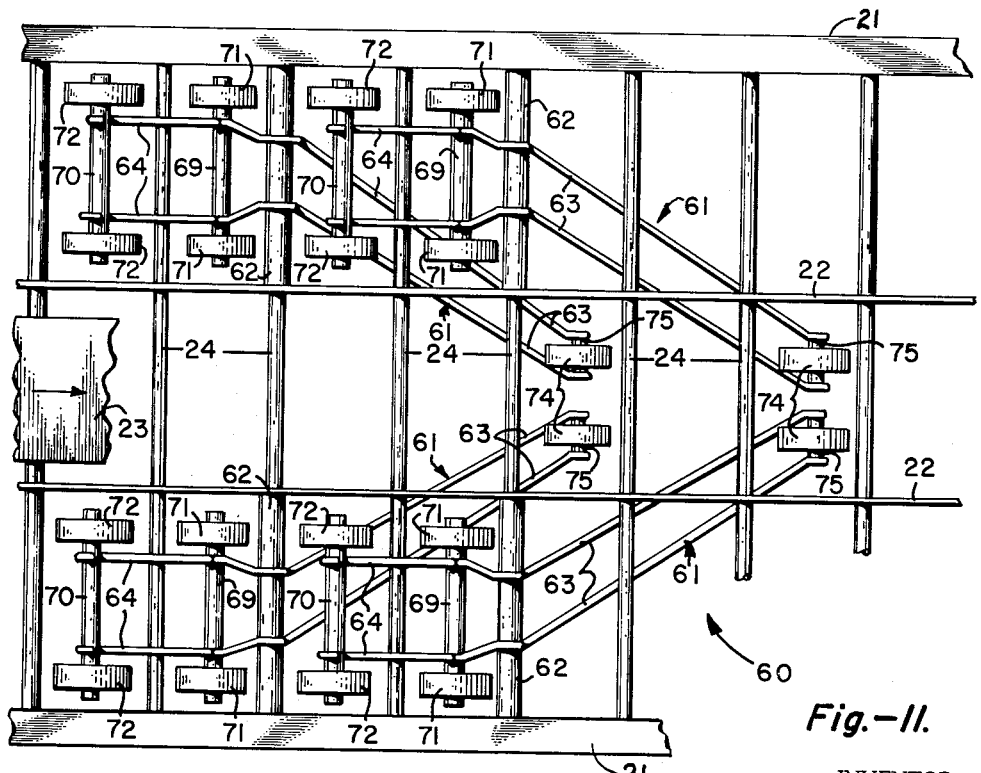
Fig.-11.
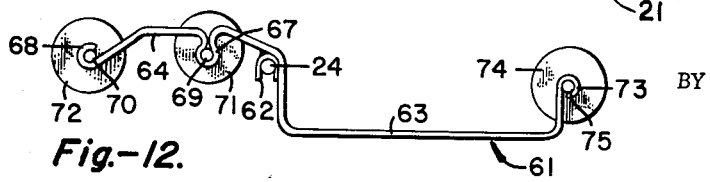
Fig.-12.
INVENTOR.
THOMAS C. McGOW
BY
Price and Henovold
ATTORNEYS July 31, 1962 T. C. McGOW 3,047,127
WEIGHT SENSITIVE CONVEYOR
Filed Jan. 19, 1959 6 Sheets-Sheet 4

INVENTOR.
THOMAS C. McGOW
BY
Price and Heneveld
ATTORNEYS

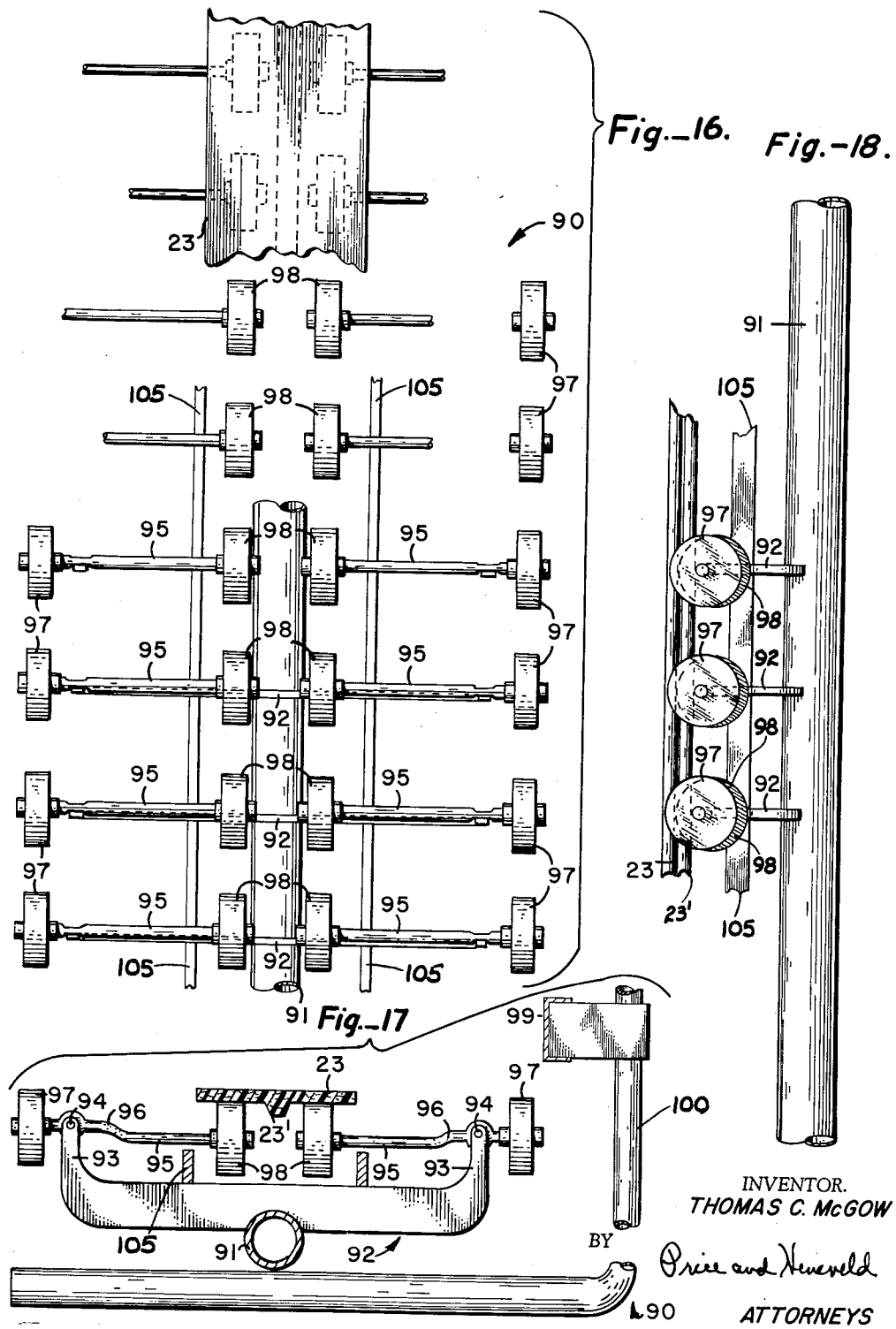

July 31, 1962 T. C. McGOW 3,047,127
WEIGHT SENSITIVE CONVEYOR
Filed Jan. 19, 1959 6 Sheets-Sheet 6

INVENTOR.
THOMAS C. McGOW
BY
Price and Heneveld
ATTORNEYS

United States Patent Office 3,047,127
Patented July 31, 1962

3,047,127
WEIGHT SENSITIVE CONVEYOR
Thomas C. McGow, Convent, N.J., assignor to The Rapids-Standard Company, Inc., Grand Rapids, Mich., a corporation of Michigan
Filed Jan. 19, 1959, Ser. No. 787,409
16 Claims. (Cl. 198—160)

This invention relates to conveyors, in general, and more particularly to article conveyors adapted to handle articles of widely varying weights.

A certain force is required to be applied to the underside of each article by the conveyor means to overcome its resistance to movement and to cause article flow. The amount of force required to move each article depends to a substantial extent upon its weight, the greater the weight the greater the propelling force required.

Heretofore, power driven conveyors for use in situations involving the simultaneous transportation of articles of widely varying weights and sizes have consisted of a driven belt extending the full width of the conveyor. This is not satisfactory because such belts are expensive, require costly periodic replacement and necessitate the use of prime movers and power transmitting components far in excess of that which is actually necessary to effect movement of the articles. The desirable solution is the use of a narrow power driven propelling member such as a narrow belt flanked by lanes of gravity type conveyor such as conveyor wheels or rollers. A substantial proportion of the weight and bulk of the articles is carried on the gravity type conveyor with the propelling member carrying only enough of the weight to assure movement of the article. Heretofore, this solution to the problem has not been practical because a propelling member set at a height with respect to the gravity portion of the conveyor sufficient to assure movement of the light weight articles exerted too little pressure against the heavier articles to keep them moving. If the belt height were made adequate to move the heavier articles, the lighter articles were lifted entirely from the gravity conveyor and carried solely by the propelling member.

It is not feasible to materially increase the frictional coefficient of the belt surface to overcome this problem. This may operate effectively under ideal conditions but such conditions only occur periodically. Article flow stoppages occur on conveyors either by accident or by design such as when a gate must be provided to regulate article flow onto connecting conveyors or continuing sections of the conveyor. Where this occurs with a propelling member having a very high coefficient of friction the results can be disastrous. The accumulated tension applied to the propelling member may result in damage to its driven mechanism such as pulleys, shafts and speed reducers. It frequently results in burning out the prime mover. If this does not occur, the drag of the belt against the articles results in serious damage to the articles and excessive wear to the belt. It has even been known to cause fires due to frictional heat. These are but some of the problems solved by this invention.

A partial solution to the problem has been practiced in mounting the propelling member on a floating support throughout its length and adjusting the vertical position of the propelling member in accordance with the total weight imposed upon the conveyor. Such conveyors, however, adjust only to total operating conditions of the conveyor. They are incapable of adjusting to the requirements of each individual article. These conveyors operate on the principle of a high belt depressed by articles to distribute part of the article's weight to the flanking conveyor track. This invention operates on the principle of a depressed belt raised to propelling position by a portion of the article's weight being translated into upward belt pressure.

This invention provides a conveyor permitting the use of a relatively low cost, narrow propelling member, a comparatively light duty power drive without sacrificing the ability of the conveyor to dependably handle a wide variety of articles each necessitating the application of a different propelling force to assure its movement. The articles are individually handled and the adjustment of the conveyor to the requirements of each individual article is fully automatic.

This invention may be applied to an entire conveyor or merely to selected sections of a conveyor system where conditions make its use desirable. The altitude of the conveyor is not important as it may be used where the conveyor track is level or inclined.

It is an object of this invention to disclose a conveyor having powered conveyor means adapted for article engagement to the extent required to move an article along the conveyor and no more. Each article is determinative of the extent of conveyor engagement therewith and is independent of the conveyor engagement with other articles.

Another object of this invention is to disclose a conveyor which is sensitive to the individual weight of an article in establishing the engagement necessary to move such article with the powered conveyor means. The weight sensitive means employed enables each article to prescribe the minimum frictional force necessary to effect its movement and thereby assures minimum end pressure loading and friction wear for both belt and articles when the conveyor is in use.

Still another object of this invention is to disclose a conveyor having a weight-force transfer system wherein the weight of an article is translated into a force to effect its movement. The weight-force transfer system of this invention may be employed to relay information as to the weight of an article to a mechanism for applying a propelling force to the same article at a distance removed therefrom and for limiting the magnitude of such force to that which is necessary to effect article movement.

A further object of this invention is to disclose several different forms of conveyors making use of the weight sensitive and weight-force transfer means of this invention and to teach the adaptation of such means to other conveyor systems.

A still further object of this invention is to disclose conveyors including the advantages mentioned and which are simple and inexpensive to manufacture, assemble and install. The weight sensitive means and the weight-force transfer system disclosed are hereinafter shown in a simple mechanical form. The advance taught by this invention is disclosed as a subassembly easily adaptable for use in existing or new conveyor systems. Further, the subassembly is readily relocated, removed for inspection or repair, and requires no adjustment after installation, though adjustment provisions may be provided as an integral part of the installation.

The means of connecting together the article and belt engaging means may vary. One preferred form is to have the means mounted on opposite ends of a pivotal arm supported on the conveyor bed. A weight force on the means at the article ends of the arm becomes a belt engaging force at the means at the belt end of the arm. Further, the fulcrum for the pivotal arm may be disposed to provide a certain ratio of weight to force conversion.

These and other objects and advantages in the practice of this invention will be more apparent in the illustration and description of a working embodiment of the invention, as hereinafter set forth.

In the drawings:

FIG. 7 is a plan view of one form of accumulator conveyor made in accordance with the teachings of this invention.

FIG. 8 is a side view of two species of the weight sensitive means for conveyor belt adjustment illustrated in FIG. 1.

FIG. 8a is a side view of a modification of part of one of the weight sensitizers of FIG. 8.

FIG. 9 is a plan view of another form of accumulator conveyor made in accordance with the teachings of this invention.

FIG. 10 is a side view of the article and belt engaging assembly shown in FIG. 9.

FIG. 11 is a plan view of still another form of accumulator conveyor made in accordance with the teachings of this invention.

FIG. 12 is a side view of a single component of the article and belt engaging assembly of FIG. 11.

FIG. 16 is a fragmentary plan view of another form of conveyor incorporating the teachings of this invention.

FIG. 17 is a sectional end elevation view of the conveyor shown in FIG. 16.

FIG. 18 is a fragmentary side elevation view of the accumulator conveyor shown in FIG. 16.

Figure 1:
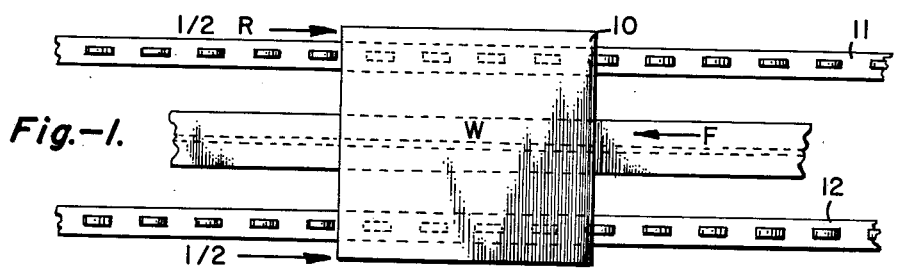
FIG. 1 is a diagrammatic plan view of an article carton on a conveyor.
Figure 2:
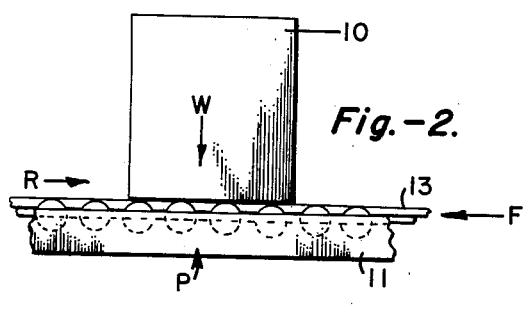
FIG. 2 is a diagrammatic side view of an article carton on a conveyor.
Figure 3:
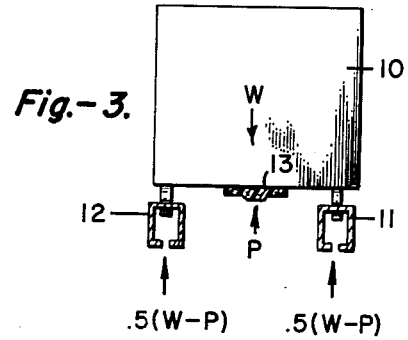
FIG. 3 is a diagrammatic sectional end view of an article carton on a conveyor.

In the conveyors hereinafter disclosed, the weight of an individual article is used to determine the force necessary to effect its movement, since its weight is the major factor determinative of its resistance to movement. Mechanical means are disclosed for sensing the weight of each separate article on a powered conveyor and for using this information to apply a propelling force to the article suited to that particular article's requirements. Accordingly, only such force is applied to each article as is necessary to effect its movement and the total propelling force exerted by the conveyor on all articles thereon collectively, is at an absolute minimum. Further, the frictional wear on each article and on the conveyor propelling member is held to an absolute minimum.

In its preferred embodiment, conveyors incorporating this invention have a central power driven propelling member travelling in a lane between two sections of article supporting track which may have as an article contact surface conveyor wheels, rollers or stationary means over which the articles slide. The propelling member is, in effect, on a plurality of floating supports with the vertical portion of the member adjustable in zones. The zones of vertical adjustment are created by the individual articles and travel with the articles along the conveyor like waves in the propelling member. A substantial portion of the weight of the articles is carried by the flanking sections of supporting track with only so much of it carried by the propelling member as is necessary to effect sufficient frictional bearing to assure movement with the propelling member. Since the article itself determines the magnitude of the bearing pressure between it and the belt, this division of the weight between the cooperating parts of the conveyor is possible without loss of article movement.

Referring to FIGS. 1–6, there is shown a series of force diagrams which aid an understanding of the application of the principle of this invention to means other than those specifically disclosed.

The force F, necessary to effect the movement of an article 10 on a pair of spaced wheeled conveyor rails 11 and 12 is such as will overcome the frictional and inertial resistance to rotation R of the conveyor wheels. This is expressed as $F > R$.

The force F required is a factor of the pressure P of the conveyor belt 13 on the bottom of article 10 times the coefficient of friction of the belt with respect thereto. Under theoretically ideal conditions, assuming the use of a smooth rubber belt and cardboard cartons, tests will prove that an angle of inclination of 17° is necessary to start movement and that the static coefficient of friction will be .306. Thus $F = .306 P$.

The resistance R to article movement is dependent upon the coefficient of friction and inertial resistance of the conveyor wheels times the weight W of the article less the pressure P of the conveyor belt applied thereto. Two inch ball bearing wheels were used in the conveyors disclosed and tests have established that under ideal conditions the coefficient of friction for these wheels to be .04. Thus $R = .04 (W-P)$ and it follows that: (Assuming $F = R$)

$$F = R$$
$$.306P = .04(W-P)$$
$$.306P = .04W - .04P$$

$$P = \frac{.04W}{.346} = .12W$$

Accordingly, a belt pressure equal to 12% of the weight of an article to be conveyed, when applied to the underside of a smooth rubber belt for engaging the belt with a cardboard carton containing the article, and with the belt supported on two inch conveyor wheels (as tested), will cause movement of the article. This pressure is only that which is necessary to move the article and no more. Thus, when the movement of the article is stopped, as for purposes of accumulation or a temporary blockage of the conveyor track, the propelling force exerted on each article will be an absolute minimum and so will the wear due to the frictional movement of the conveyor belt under the articles.

Figure 4:
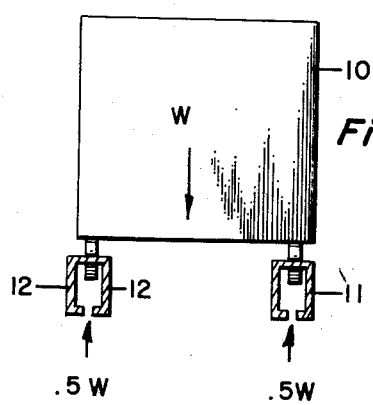
FIG. 4 is another diagrammatic sectional end view of an article carton on a conveyor and showing a different force vector diagram.
Figure 5:
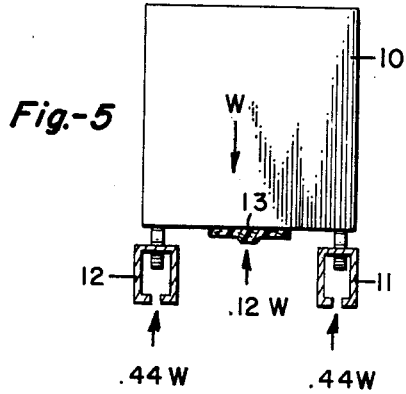
FIG. 5 is a diagrammatic sectional end view of an article carton on a conveyor with a still different force vector arrangement.

The weight of an article on a pair of spaced wheeled conveyor rails produces the force diagram of FIG. 4. One-half the weight of the article is carried by each conveyor rail. With a belt pressure equal to 12% of the weight of the article, only 44% of the article's weight must be carried by each wheeled track (FIG. 5).

Figure 6:
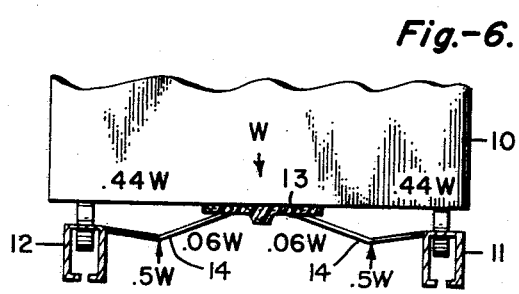
FIG. 6 is a diagrammatic sectional end view of part of an article carton on a conveyor with the weight sensitive belt tensioning means of this invention diagrammatically illustrated therewith.

If the article weight, which is supported on each wheeled track, is used to obtain the necessary belt pressure of 12% of the weight of the article, only 6% of the weight from each weight supporting source is needed. This weight percentage is obtained by a mechanical linkage 14 having a leverage advantage to convert .44W to .06W. In other words, a 7.3 to 1 lever arm ratio (or for practical purposes 7 to 1) will work (FIG. 6).

Applying this in a practical and simple form, conveyors may be designed in any of several forms as hereinafter described and illustrated.

A conveyor 20 is shown in FIGS. 7 and 8. This conveyor includes parallel spaced wheel conveyor tracks formed by spaced guide rails 21 and 22. The outermost rails 21 define the overall width of the conveyor bed and the innermost rails 22 are spaced apart to form a lane or passageway for the conveyor belt 23. Axle shafts 24 are extended through both sets of guide rails and may have spacers provided thereon to establish the desired conveyor track and belt passage widths. Conveyor wheels 25 are mounted in fixed locations on the axle shafts 24 and provide a given wheel pattern for the wheeled conveyor track sections. The conveyor wheels 25 are alternately spaced near the sides and centrally between the guide rails 21 and 22.

Article weight sensing devices 30 and 30', formed in accordance with the teachings of this invention, are adapted for use with the conveyor 20. Each weight sensing device includes a saddle member 31 received on one of the axle shafts 24. A pair of forwardly extended arms 32 and a pair of rearwardly disposed arms 33 are engaged to the saddle member, as best shown in FIG. 8. The rearwardly disposed arms 33 are much shorter than the forwardly disposed arms 32. The ratio of arm lengths is approximately 1 to 7, in accordance with the teachings previously set forth. However, where a portion of the article's weight may be supported by means other than that affecting the belt's pressure, other ratios may be designed into the conveyor. Article engaging wheels 34 are rotatably mounted on the ends of the rearwardly disposed arms 33. Conveyor belt engaging wheels 35 are rotatably mounted on the ends of the forwardly extended arms 32.

The saddle member 31 of the weight sensing device 30 and 30' is mounted on one of the axle shafts 24 between a pair of the conveyor track section wheels 25. The short arms 33 dispose the article engaging wheels 34 within the conveyor track sections between the guide rails 21 and 22. The longer arms 32 are formed to extend under the inner guide rails 22 and to dispose the belt engaging wheels 35 within the belt passageway and for engagement with the underside of the conveyor belt 23.

Pairs of the weight sensing devices 30 and 30' are arranged so that their belt engaging wheels 35 are disposed together within the belt passageway and their article engaging wheels are across from each other in the wheeled conveyor track sections on opposite sides of the belt passageway. The weight sensing devices 30 have their belt engaging wheels 35 disposed closer together than do the weight sensing devices 30'. These devices may be of the same construction with this single exception. The alternately close and separated spacing of the belt engaging wheels 35 is to afford better lateral support for the conveyor propelling member or belt 23 and to orient the conveyor belt within the belt passageway by limiting lateral movement thereof by means of the guide rib 23' on the underside of the belt.

The weight sensing devices 30 and 30' may have integral or attached pivotal stop members provided thereon. As shown by FIGS. 8 and 8a, the longer lever arms 32 extend under a pair of axle shafts 24 to a position within the belt passageway. The longer arms and the wheel 35 provide a force coupled about the fulcrum point tending to rotate the devices in a manner causing the belt wheels 35 to be lowered and the article wheels 34 to be raised. This movement of the arms is also assured by the added weight of the belt 23. A stop 36 may be secured to the arms 32 to limit this pivotal movement. Or, a stop 37 may be formed from the end of the wire arm 32 and extend beyond a wheel axle retaining bite 38 formed therein. A still different form of stop 39 is shown in FIG. 8a.

The pivotal stops 37, 38 or 39 serve to support the belt wheels in a position which disposes the conveyor belt 23 just below the load bearing surface of the fixed conveyor wheels 25. At the same time, the article engaging wheels 34 have their article engaging surface disposed above the level of the fixed conveyor wheels 25.

The weight sensing devices 30 and 30' as disposed in the conveyor 20 function as follows:

Articles flow in the direction of the arrow shown on the conveyor belt 23. The articles are supported on the fixed conveyor wheels 25 of the spaced wheel conveyor track sections and straddle the belt passageway therebetween. As the articles are moved on the conveyor 20, they come into engagement with the article wheels 34. The weight of the article is imposed upon the wheels 34, depressing them. The weight of the article will determine the degree to which they are depressed. The lighter the article the less the downward movement of the wheels 34. The heaviest articles will depress them to the level of the fixed wheels 25. This weight is applied on the end of the short lever arms 33, across the fulcrum provided by the saddle mount 31 disposed on one of the axle shafts 24, and as a force at the end of the longer lever arms 32. This lifts the belt wheels 35 and the conveyor belt 23 into a given pressure relationship to the underside of the article. With the ratio of the length of the arms 32 and 33 predetermined, in accordance with the teachings previously set forth, only such pressure is applied to the conveyor belt 23 as is required by a particular article to cause its movement by the belt 23. Thus the end pressure and belt wear will be at a minimum for transportation of the articles along the conveyor 20.

The above described construction while useful under many operating circumstances has some practical limitations. Its capacity to handle articles of widely varying sizes and weights is limited to reasonable ranges. The constructions which are about to be described avoid these size and weight range limitations. These constructions employ only the belt and the sensing wheels as article supports.

FIG. 9 illustrates one side of a conveyor 40. This conveyor includes the side rail 21 and guide rail 22 as previously described as well as a plurality of axle shafts 24 extended therethrough. The location of the axle shafts 24 relative to the top edge of the rails 21 and 22 may differ slightly for fixing the level of the load bearing surfaces of the conveyor track section wheels. However, the form of the conveyor bed is generally the same as that previously described.

The conveyor 40 includes weight sensing devices 41 formed from stampings. The weight sensing devices 41 include a bite formed in the stamped blank to provide a saddle 42. The weight sensing devices 41 are mounted on the conveyor bed by having the saddle 42 disposed over one of the axle shafts 24. Each weight sensing device 41 is formed to include a rearwardly disposed part 43 and a forwardly extended part 44. Each of these parts include cutout portions 45 and 46 respectively to reduce their weight. The one part 43 is disposed between the rails 21 and 22 within the wheel track sections. The other part 44 is formed to extend under the conveyor track structure including the rail 22 into the belt passageway. The conveyor belt is identified by the numeral 23, as previously. Depending ears 47 and 48 are formed from the rearwardly disposed part 43 to support the wheel shafts 49 and 50, respectively, as best shown in FIG. 10. Pairs of conveyor wheels 51 and 52 are provided on the ends of the wheel shafts 49 and 50, respectively. Upturned ears 53 are provided on the end of the forwardly disposed part 44. These ears support a shaft 55 and rotatable belt engaging wheel 54.

The rearwardly disposed part 43 of the weight sensing device is disposed over the preceding axle shaft 24 and disposes the wheels 51 and 52 within spaces provided between the axle shafts 24. The forwardly disposed part 44 of the weight sensing device is formed to extend under a pair of the axle shafts 24 and to dispose the belt wheel 54 up and between two of the axle shafts 24 within the belt passageway for engagement with the conveyor belt 23. The weight sensing devices 41 may include a stop (in the nature of the stops 36, 37 or 39 of FIGS. 8 and 8a), may be balanced, or may have a biasing spring to hold up the forwardly disposed part 44 of the weight sensing device.

The conveyor 40 is used in the following manner:

Article flow on the conveyor 40 is in the direction of the arrow shown on the conveyor belt 23. The moving articles first engage the wheels 51. They next engage the wheels 52. The wheels 52 are controlling in the weight transfer and ratio of weight-force control to the belt wheels 54. The distance of the wheels 52 from the fulcrum axle 24, as compared to the distance of the wheels 54 from the fulcrum point, is preferably 1 to 7. It will be appreciated that this form of weight sensing device arrangement provides the entire wheel pattern for the conveyor track sections flanking the propelling member or belt. The weight sensing devices 41 are easily removed, replaced, reinstalled or otherwise serviced.

Another conveyor 60 embodying the principles of this invention is shown in FIG. 11. This conveyor also includes the side rails 21 and guide rails 22 and the axle shafts 24 as previously described. As mentioned with respect to the conveyor 40 of FIG. 9, the relation of the axle shafts 24 to each other and with respect to the top or lower edges of the guide rails may vary to obtain a desired positioning of the load bearing surface of the conveyor track section wheels.

The weight sensing devices 61 used in the conveyor 60 are similar to the weight sensing devices 41 used in the conveyor 40 shown in FIG. 9. However, the weight sensing devices 61 are of a wire form. They include a saddle mount 62 and pairs of forwardly disposed arms 63 and rearwardly disposed arms 64. The forwardly disposed arms 63 extend under the guide rails 22 and into the belt passageway. The rearwardly disposed arms 64 extend in generally parallel spaced relation to each other and between the side rails 21 and guide rails 22 within the wheel track sections. The conveyor belt is identified as 23. A bite 67 and end loop 68 are formed within the rearwardly disposed arms 63 to accommodate the wheel shafts 69 and 70, respectively. Pairs of conveyor wheels 71 and 72, respectively, are mounted on the wheel shafts 69 and 70. A closed loop 73 is formed at the ends of the forwardly disposed arms 63 to rotatably support the belt engaging wheel 74 on a shaft 75.

The disposition of the weight sensing devices 61 as used in the conveyor 60 is the same as that of the devices 41 used with the conveyor 40 shown in FIG. 9. The conveyor wheels 71 and 72 are disposed within the wheel track sections for carrying the article moved by the conveyor belt 23. The conveyor wheels 72 closest to the saddle mount 62 are controlling as regards the weight-force ratio transfer to the belt pressurizing wheels 74. It will again be appreciated that devices 61, as the devices 41, form the entire wheel pattern for the conveyor 60.

Figure 13:
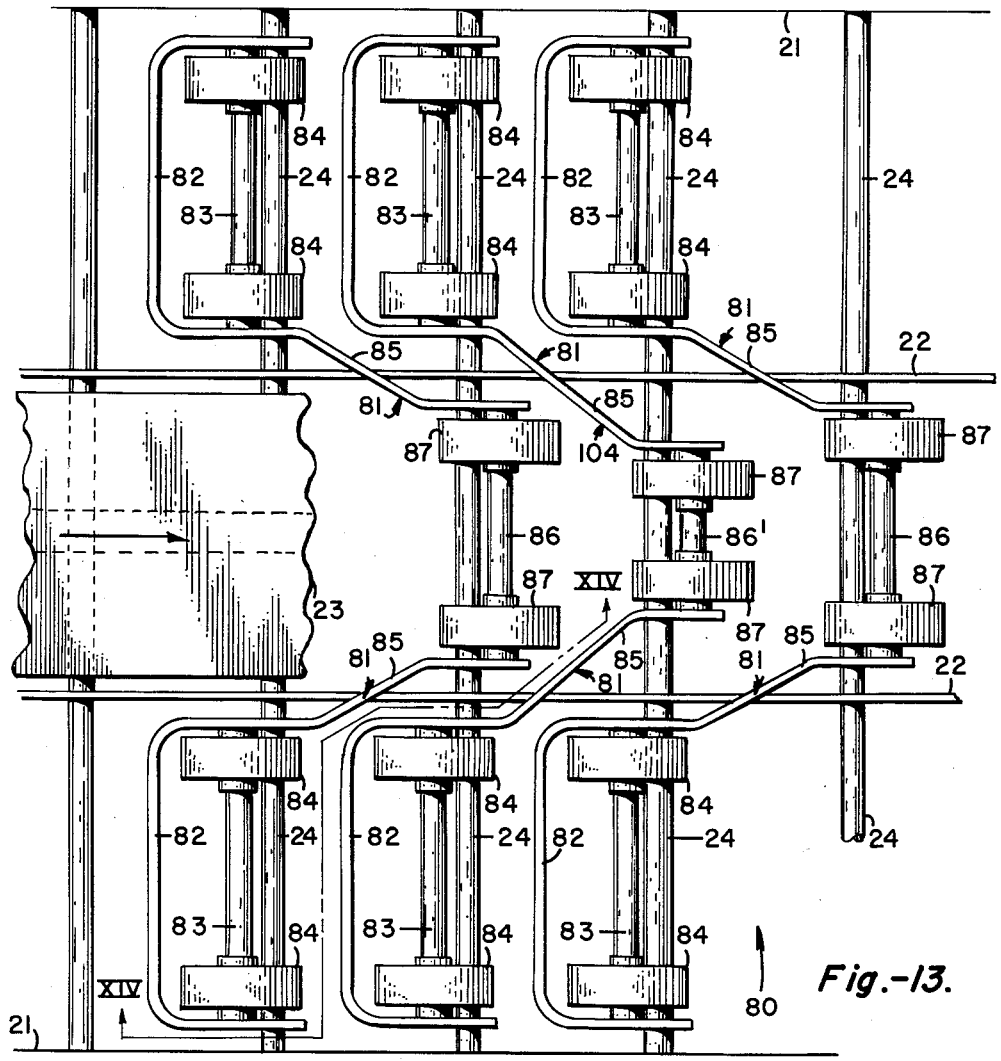
FIG. 13 is a plan view of a still further accumulator conveyor which may be made in accordance with the teachings of this invention.

A still further form of conveyor 80, embodying the principles of this invention, is shown in FIG. 13. The conveyor bed again includes side rails 21, guide rails 22 and axle shafts 24 as previously described. They are arranged to provide conveyor track sections on each side of a belt passageway. The conveyor belt is again identified by the numeral 23.

In the conveyor 80 the weight sensing devices are identified by the numeral 81. These weight sensing devices 81 are formed from sheet or strip stock and may be stampings. They include a yoke 82 supporting a wheel shaft 83 upon which is mounted a pair of conveyor wheels 84. The stamping is formed to include an extended arm 85 which has its end disposed within the belt passageway. Alternate pairs of right and left forms of the devices 81 are joined together by wheel shafts 86 and 86' which connect together the ends of the extended arms 85. Belt engaging wheels 87 are mounted on the wheel shaft 86 and 86'. The weight sensing devices 81 are mounted on one of the axle shafts 24 by means of a fulcrum slot 88 within the bottom edge of the yoke 82.

Figure 14:
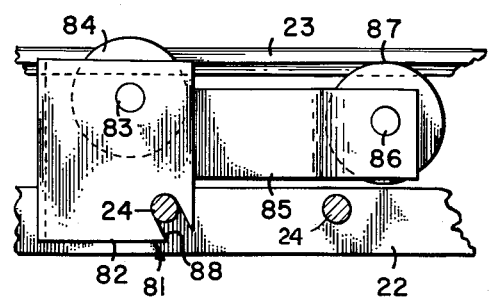
FIG. 14 is a sectional elevation view of the weight sensitive belt adjusting subassembly taken along the plane XIV—XIV of FIG. 13.
Figure 15:
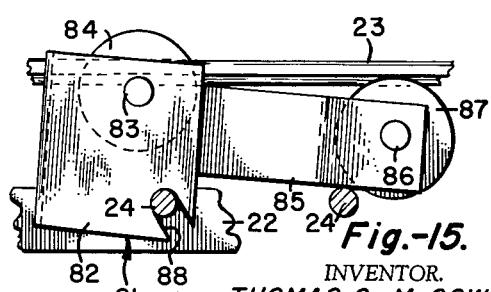
FIG. 15 is a sectional elevation view corresponding to FIG. 14 illustrating the assembly at the opposite limit of its operational movement.

The weight sensing devices 81 rest upon and occupy the top of the conveyor bed. The conveyor wheels 84 form the entire wheel pattern for the conveyor track sections. The conveyor wheels 87 form the sole support for the belt 23. The forwardly disposed arms 85 of the weight sensing devices extend over the guide rails 22, which define the belt passageway, so that the wheels 87 mounted at the ends thereof are disposed under the conveyor belt 23. Alternate pairs of the belt engaging wheels 87 are closely and widely spaced for belt guiding and support purposes. It will also be appreciated that the arms 85 extend over one of the axle shafts 24. The axle shafts thus serve as stops for the weight sensing devices 81, as shown in FIG. 15, preventing excessive movement in their normal tendency to pivot the belt wheels down and the article engaging conveyor wheels 84 up. The weight sensing devices 81 are shown in use in FIG. 14 and in their retracted or at rest position in FIG. 15.

The conveyor 80 of FIG. 13 is adapted to have articles flow in the direction of the arrow shown on the conveyor belt 23. As the articles engage the wheels 84, within the conveyor track sections, they cause the pivot arms 85 to be raised and the belt engaging wheels 87 to impose a pressure on the underside of the conveyor belt 23. This pressure is in accord with the weight of the article and is dependent upon the ratio of the distance of the wheels 84 and 87 from the axle shaft 24 upon which the weight sensing devices 81 are mounted.

It will again be appreciated that the conveyor 80 makes use of weight sensing devices 81 which form its entire wheel pattern. The weight sensing devices 81 are readily mounted on the conveyor bed and are easily removed for repair or replacement. The fulcrum slot 88 is provided at an angle from the bottom corner edge of the yoke portion 82 and adequately serves to prevent inadvertent removal of the weight sensing devices 81 from the conveyor bed.

Figure 19:
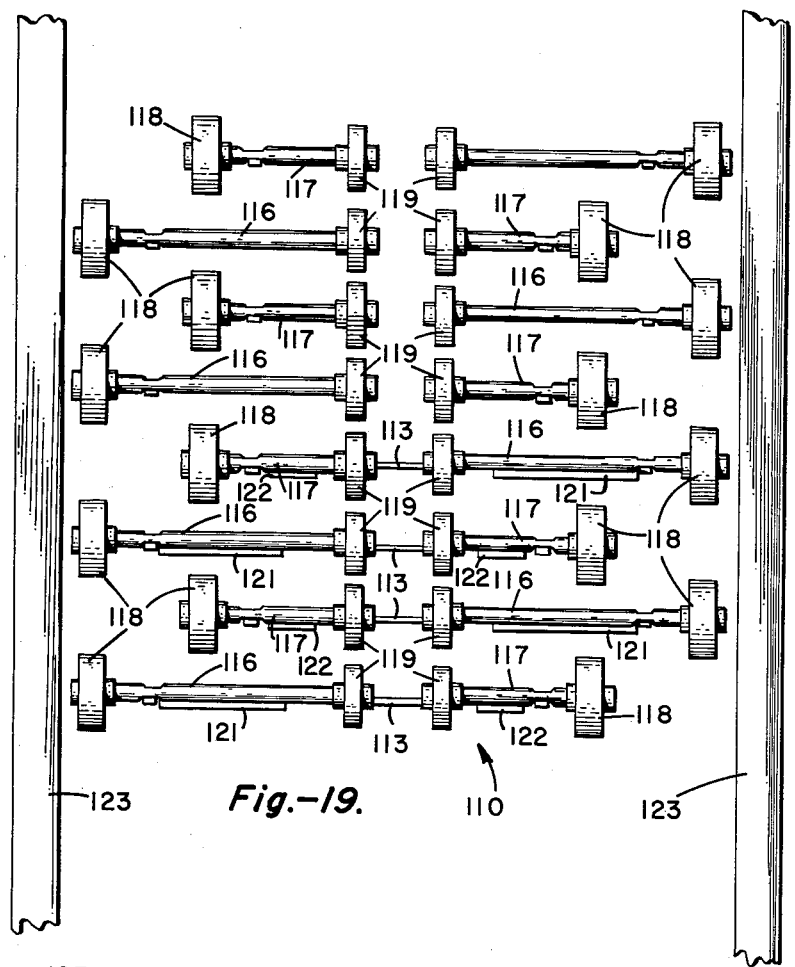
FIG. 19 is a fragmentary plan view of a further form of conveyor incorporating the teachings of this invention.

The conveyors shown in FIGS. 16 and 19 are different from those previously described. The other conveyors made use of a common form of conveyor bed. These latter conveyors make use of a functionally similar conveyor frame arrangement but one structurally different from that previously described. Further, the article receiving wheels of the previous conveyors were spaced apart from the belt pressurizing wheels, in the direction of article movement, to provide an article weight sensing position disposed upstream and apart from the belt pressurizing area. The rearwardly and forwardly disposed parts of the weight sensing devices provided an interconnection between the weight sensing wheels and the belt pressurizing wheels for both transmitting the information received at one to the other and for utilizing such information. In the conveyors about to be described, the article receiving wheels and the belt engaging wheels are aligned across the conveyor bed and serve to immediately transfer and utilize the weight information.

Referring to FIG. 16, there is shown a conveyor 90 having a conveyor frame which includes a tubular center rail 91. Cross supports 92 are secured to the center rail 91 (FIGS. 17 and 18). The ends of the cross supports 92 are turned up to form ears 93. Pivotal connections 94 are provided in the upturned ears 93 to support wheel shafts 95 which extend normal to the direction of article flow and across the conveyor bed. The shafts 95 include an offset 96. An article engaging wheel 97 is disposed on the shorter end of the wheel shaft 95 and a belt engaging wheel 98 is disposed on the other end of the wheel shaft. The wheels 97 are aligned in the direction of article movement and are provided on each side of the conveyor frame to form the conveyor wheel track sections. The belt wheels 98 are aligned centrally of the conveyor frame to receive, support, and guide the conveyor belt 23. It will be appreciated that the offset 96 enables the use of the same size of article wheels 97 and belt wheels 98. A straight shaft might be provided with the belt wheels 98 being of a smaller size than the article wheels 97 (as will be shown in the conveyor of FIG. 19).

The conveyor frame includes an article guide rail 99 supported by an arm 100 secured at spaced intervals to the center rail 91 of the conveyor frame.

As articles travel on the conveyor 90, their weight is imposed upon the article wheels 97 and is translated to a belt pressurizing force at the belt engaging wheels 98 in accordance with the distance of the article and belt wheels from the pivotal connections 94. A strip 105 may be provided as a lower stop or rest for the inner ends of the shafts 95. The strips 105 may be attached to the cross supports 92 by any suitable means such as welding or notching to seat down over the supports.

Figure 20:
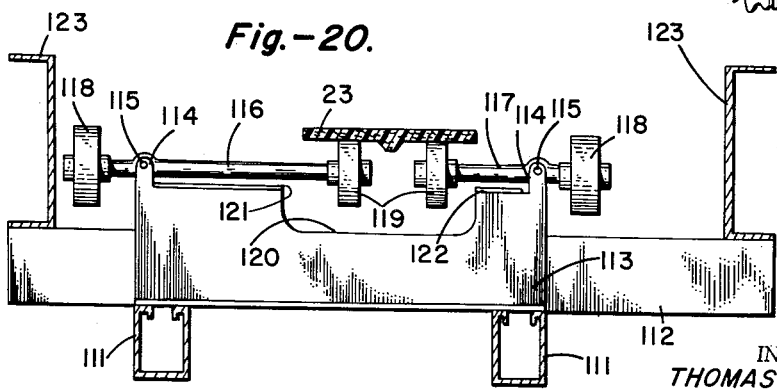
FIG. 20 is a sectional end elevation view of the conveyor shown in FIG. 19.

The conveyor 110 shown in FIGS. 19 and 20 is similar to the conveyor 90 of FIGS. 16, 17 and 18. The conveyor bed includes longitudinal members 111 having cross ties 112. Conveyor wheel supports 113 are secured to the cross ties 112. The support members have upturned ears 114 at their ends. Pivotal connections 115 are provided within the upturned ears 114. Wheel shafts 116 and 117 are pivotally mounted within the connections 115 provided. Article wheels 118 are mounted on the outer ends of the wheel shafts 116 and 117 and belt engaging wheels 119 are mounted on the inner ends of such shafts. The wheel shafts 116 and 117 are straight rather than offset as were the wheel shafts 95 in the conveyor 90 of FIG. 16. However, the article engaging wheels 118 are larger than the belt engaging wheels 119. Accordingly, the same effect is obtained. The support members 113 are undercut as at 120 to accommodate the belt engaging wheels 119. Shoulders 121 and 122 provide stops for the lower disposition of the belt engaging wheels 119.

The support members 113 may be reversed along the length of the conveyor frame to provide the wheel pattern shown by FIG. 19. The belt engaging wheels 119 are aligned along the length of the conveyor while the article engaging wheels 118 are alternately disposed near the article guide rails 123, at the outer sides of the conveyor, and at an intermediate disposition nearer the conveyor belt 23.

The structures which are illustrated and have been described each employ a common method for providing for increased belt pressure created by and in proportion to the weight of the article. Articles are received on a conveyor member and are supported near the sides of their bottom surface. Means for moving the articles is disposed between the article supporting members and is made vertically adjustable for variable engagement with articles disposed thereover. The presence of an article on the supporting members is first detected. This means, in one form, may constitute only a portion of the belt flanking article supporting members or it may constitute the entire belt flanking article supporting means. A lever arm ratio connection is provided between the device used to detect the presence of an article on the conveyor and the means for variably adjusting the disposition of the article motivating conveyor belt. Accordingly, the weight of an article may be detected at one location and may be used as a belt adjusting force at another location. With the proper lever arm ratio, the belt force need be only such as is necessary to effect article flow and, therefore, minimum tension is exerted on the belt.

Each individual article will determine the propelling force applied to itself. The distance between the article sensing and belt pressure applying means is preferably less than the length of an article. However, during close pack operation or on article flow stoppage, the end of one article may be over the belt pressure applying means while another article is over the detecting means. This will usually occur only when the lengths of the articles on the conveyor vary. Otherwise the weight-force transfer devices can be designed for the article length.

It will be recognized that while the propelling member has been described as a belt, any other form of propelling member may be utilized with this invention, as for example, a rope or chain. It will also be recognized that wheels have been described on the ends of the information and weight transferring levers, this is merely a preferred embodiment since stationary surfaces over which either the articles or propelling member slide may be substituted within the principles of this invention. This means by which the propelling member is driven is neither illustrated nor described since it is wholly conventional and any one of many available driving means may be employed.

It will be recognized that it is possible to reverse the parts of the conveyors herein described and illustrated by providing a stationary support for the belt and so supporting the wheels or rollers of the lanes of flanking conveyor that the latter are vertically adjustable. This will result in differentiating the bearing pressure between the propelling member and the article to assure article movement. While this arrangement is feasible, it is not preferred because it involves a more expensive structure and in some instances will fail to provide the degree of sensitivity required for precise operation.

While a preferred embodiment of this invention has been described, it will be understood that other modifications and improvements may be made thereto. Such of these modifications and improvements as incorporate the principles of this invention are to be considered as included in the hereinafter appended claims unless these claims by their language expressly state otherwise.

I claim:

1. Weight responsive means for use with conveyors, said means comprising: a power driven article propelling means, sensing means disposed to be successively contacted by each article moving along said conveyor and effective to detect the presence and weight of each individual article on said conveyor, propelling force increasing means disposed to influence the same article and disposed apart from said sensing means and effective to urge said article propelling means against the article to increase the propelling force applied by said propelling means to the same article as necessary to move the same article detected by said sensing means, and an operative interconnection between said sensing and said propelling force increasing means for transferring and utilizing information received by said sensing means at said propelling force increasing means.

2. A weight sensitive device for use with conveyor means in determining the presence and weight of an article on a conveyor and utilizing such information to regulate the conveyor means as necessary to move the same article therewith, said device comprising: an article propelling member means disposed for engagement with an article on said conveyor, means disposed for engagement with said article propelling member when said article engaging means engages the same article and spaced apart from said article engaging means, and a ratio arm connection between said article engaging means and said article propelling member engaging means for translating the weight of the article as detected by said article engaging means to a force applied through said article propelling member engaging means to said article propelling member for regulating the engagement of said article propelling member with the same article thereon as necessary for article movement therewith.

3. A conveyor comprising: an article flow track having a plurality of relatively friction free article supporting members mounted thereon and disposed in parallel spaced relation along each side thereof, a power driven propelling member mounted on said flow track between said article supporting members and extending substantially the length thereof, and means for successively sensing the weight of each individual article on said flow track and increasing the bearing pressure between said propelling member and the same article.

4. A conveyor, comprising: an article flow track having a plurality of relatively friction free article supporting members mounted thereon and disposed in parallel spaced relation along each side thereof, a power driven conveyor means mounted on said flow track between said article supporting members and extending substantially the length thereof, means disposed for engagement with an article on said conveyor, means disposed for engagement with said article conveyor and spaced apart from said article engaging means, and a lever arm connection between said article engaging means and said conveyor engaging means for translating the weight of said article as detected by said article engaging means to a force applied through said conveyor engaging means to said conveyor means for increasing the propelling force exerted by said conveyor means to the same article engaged by said article engaging means as necessary for article movement with said conveyor means.

5. A weight sensitive conveyor comprising: an article flow track including a plurality of article receiving rotatable members disposed in parallel spaced relation along opposite sides thereof and having a propelling member disposed therebetween and extending substantially the length thereof, article engaging members disposed among said article receiving rotatable members for sensing the weight of an article supported thereon, propelling member engaging elements disposed in spaced relation apart from said article engaging members for engagement with the underside of said propelling member, and an operative interconnection between said article engaging member and said propelling member engaging element for applying an upward force generated by the weight of said article to said propelling member engaging elements to said press said conveyor member against the same article with the minimum force necessary to assure the same article's movement with said propelling member.

6. A weight sensitive conveyor comprising: parallel spaced lengths of article supporting flow tracks, a power driven conveyor belt disposed between said article flow tracks for engagement with the underside of articles received and supported thereon, article engaging members disposed within said flow tracks, means of vertically adjusting said conveyor belt, said adjusting means being disposed in engagement with said conveyor belt and being spaced apart from said article engaging members, and a mechanical lever arm having a leverage ratio providing connection between said article engaging members and said conveyor belt adjusting means for applying a predetermined proportion of the weight of an article in engagement with said article engaging members as a force through said conveyor belt adjusting means to said conveyor belt to increase the propelling force exerted on the same article as necessary to obtain the article's movement with said conveyor belt.

7. A weight sensitive conveyor comprising: parallel spaced lengths of conveyor wheel track sections, a power driven conveyor belt mounted between said track sections for engagement with the underside of articles received and supported on said track sections, a plurality of combination weight sensing and belt adjusting members each pivotally engaged on said track sections nearer to one of their ends than the other thereof whereby each of said belt adjusting members has a shorter end and a longer end, conveyor wheels mounted on said shorter ends of said combination members and disposed in article engaging relation within said track sections, belt guiding and engaging conveyor wheels mounted on said longer ends of said combination members and disposed under said conveyor belt, said combination members adapted to have the article engaging wheels thereof depressed by the weight of an article on said track sections and thereover and in response thereto to have the belt engaging wheels thereof raised to apply a leverage force for adjusting said conveyor belt into increased article propelling engagement.

8. A weight sensitive conveyor comprising: parallel spaced lengths of conveyor wheel track sections having a plurality of axle shafts for supporting a plurality of conveyor wheels in a given wheel pattern, a power driven conveyor belt mounted between said track sections for engagement with the underside of articles received and supported on said track sections, a plurality of combination weight sensing and belt adjusting members each having a shorter end and a longer end and a fulcrum saddle at the juncture between said ends, said fulcrum saddles being removably engaged with one of said axle shafts, said shorter ends of said combination members being disposed in article engaging relation within said track sections, said longer ends of said combination members being disposed under said conveyor belt, said combination members being adapted to detect the presence and weight of an article on said track sections and to apply said weight as a leverage force to adjust said conveyor belt into increased article propelling engagement.

9. A weight sensitive conveyor comprising: parallel spaced lengths of conveyor wheel track sections; a power driven conveyor belt mounted between said track sections for engagement with the underside of articles received and supported on said track sections; a plurality of combination article supporting, weight sensing, belt adjusting members each having a shorter end and a longer end and a fulcrum at the juncture between said ends; a plurality of conveyor wheels mounted on said shorter ends of said combination members and forming at least a substantial part of the wheel pattern of said track sections; belt guiding and engaging conveyor wheels mounted on said longer ends of said combination members and disposed under said conveyor belt; said conveyor wheels on said shorter end being offset upstream of said conveyor from said belt guiding wheels; said combination members being adapted to detect the presence and weight of an article on said track sections and to apply said weight as an upward leverage force to adjust said conveyor belt into increased article propelling engagement.

10. A weight sensitive conveyor comprising: parallel spaced lengths of conveyor wheel track sections; a power driven conveyor belt mounted between said track sections for engagement with the underside of articles received and supported on said track sections; a plurality of combination article supporting, weight sensing, belt adjusting members each having a shorter end and a longer end and a fulcrum saddle at the juncture between said ends, said fulcrum saddles being removably engaged with said track sections; a plurality of conveyor wheels mounted on shorter ends of said combination members and forming at least a substantial part of the wheel pattern of said track sections; belt guiding and engaging conveyor wheels mounted on longer ends of said combination members and disposed under said conveyor belt; said combination members being adapted to detect the presence and weight of an article on said track sections and to apply said weight as a leverage force to adjust said conveyor belt into increased article propelling engagement, those conveyor wheels on the shorter ends of said combination members including pairs of conveyor wheels at different spaced relations from said fulcrum saddle for variable actuation of said belt engaging conveyor wheels as an article is moved thereover.

11. A weight sensitive conveyor comprising: parallel spaced lengths of conveyor wheel track sections; a power driven conveyor belt mounted between said track sections for engagement with the underside of articles received and supported on said track sections; a plurality of combination article supporting, weight sensing, belt adjusting members each having a shorter end and a longer end and a fulcrum saddle at the juncture between said ends, said fulcrum saddles being removably engaged with said track sections; a plurality of conveyor wheels mounted on the shorter ends of said combination members and forming at least a substantial part of the wheel pattern of said track sections; belt guiding and engaging conveyor wheels mounted on the longer ends of said combination members and disposed under said conveyor belt; said combination members being adapted to detect the presence and weight of an article on said track sections and to apply said weight as a leverage force to adjust said conveyor belt into increased article propelling engagement, those conveyor wheels on the shorter ends of said combination members including pairs of conveyor wheels at different spaced relations from said fulcrum saddle for variable actuation of said belt engaging conveyor wheels as an article is moved thereover and having the article engaging surface of the pair of conveyor wheels nearest said fulcrum saddle disposed higher than the other pair thereof for predominate control of said belt engaging wheels upon receipt of an article over both pairs of said wheels.

12. In a conveyor having both a low-friction article conveying bed and a power driven article propelling member, the improvement comprising: first means for detecting the weight of individual articles on said conveyor; second means for shifting said article propelling member against the individual article detected to increase the contact pressure between said propelling member and the article detected by said first means and an operative interconnection between said first and second means for activating said second means in response to information received by said first means.

13. In a conveyor having both a low-friction article conveying bed and a power driven article propelling member, the improvement comprising: a plurality of first means spaced apart lengthwise of said conveyor bed for detecting the weight of individual articles on said conveyor; a plurality of second means spaced apart lengthwise of said conveyor bed for shifting said article propelling member upwardly against the individual article detected to increase the contact pressure between said propelling member and the article detected by said first means and a separate operative interconnection between each of said first and each of said second means for individually activating each of said second means in response to information received by the operatively connected one of said first means.

14. A conveyor for articles comprising: a track; a propelling means operatively associated with said track for moving an article therealong; means having an article activated element controlling its actuation for increasing the propelling force applied to said article by said propelling means in response and proportion to the weight of the article.

15. A conveyor for articles comprising: a track; a propelling member operatively associated with said track, said propelling member transmitting its propelling force to the articles by frictional contact to propel them along said track; means for translating a portion of the weight of each article into a force; acting on said propelling member to urge said propelling member against the same article to increase the frictional contact between the propelling member and said article.

16. A conveyor for articles comprising: a track; a propelling member operatively associated with said track, said propelling member transmitting its propelling force to each individual article on said track by frictional contact to propel said articles individually along said track; article contacting means responsive to the weight of each individual article; pressure means operatively associated with said article contacting means for applying a portion of the weight of the article in contact with said article contacting means to said propelling member as a force urging said propelling member against the same article to increase said frictional contact between said propelling member and the article.

References Cited in the file of this patent

UNITED STATES PATENTS

| | | |
|---|---|---|
| 1,598,099 | Murray | Aug. 31, 1926 |
| 2,286,250 | Albertoli | June 16, 1942 |
| 2,868,400 | Powischill et al. | Jan. 13, 1959 |
| 2,869,743 | Williams | Jan. 20, 1959 |
| 2,895,593 | McKnight et al. | July 21, 1959 |